United States Patent [19]

Hamma

[11] 4,188,789

[45] Feb. 19, 1980

[54] HYDRAULIC SERVOCONTROLLER FOR A HYDROSTATIC TRANSMISSION

[75] Inventor: Karlmann Hamma, Tettnang, Fed. Rep. of Germany

[73] Assignee: Zahnradfabrik Friedrichshafen AG, Friedrichshafen, Fed. Rep. of Germany

[21] Appl. No.: 869,223

[22] Filed: Jan. 13, 1978

[51] Int. Cl.² .............................................. F16H 39/46
[52] U.S. Cl. ....................................... 60/444; 60/488; 60/494
[58] Field of Search ................. 60/445, 462, 473, 488, 60/494, 443, 444

[56] References Cited

U.S. PATENT DOCUMENTS 2,381,795  8/1945  Willett ..................................... 60/444
4,075,841  2/1978  Hamma et al. ......................... 60/444

*Primary Examiner*—Edgar W. Geoghegan
*Attorney, Agent, or Firm*—Karl F. Ross

[57] ABSTRACT

A hydrostatic transmission having a variable displacement pump whose control element varies the transmission ratio and output direction of the transmission is controlled by a hydraulic servomechanism including a direction-reversing valve and a cylinder connected to this valve. A direction selector acts upon the valve and a mechanical or hydraulic locking mechanism is provided to prevent shifting of the valve until the control element of the pump has been restored to its neutral position before direction change.

7 Claims, 2 Drawing Figures

HYDRAULIC SERVOCONTROLLER FOR A HYDROSTATIC TRANSMISSION

FIELD OF THE INVENTION

My present invention relates to a hydrostatic transmission, especially for a motor vehicle, and more particularly, to an improved servocontrol system for a hydrostatic transmission.

BACKGROUND OF THE INVENTION

In automotive vehicles it is known to provide a hydrostatic transmission between an internal-combustion engine and a load, e.g. the wheels of a vehicle, in which the hydrostatic transmission has a control element which can be shifted to either of two opposite directions from a neutral position so as to cause operation of the output shaft of the transmission in either of two opposite directions selectively.

The control element of this transmission, usually the swashplate or stroke or displacement controller of the axial piston pump of the transmission is usually displaced by a servomechanism which can include a three-position valve, the position of which is directly or indirectly selected by a direction control member, e.g. a lever. The valve, in turn, operates a servocylinder which follows the actuation of the valve and has a piston connected to the control element of the axial piston pump. The servomechanism is operated to control pressure from a control pump or some other source and a brake pedal is provided to control a throttle which selectively reduces the control pressure to permit a return of the control element of the axial piston pump to its neutral position for hydrodynamic braking via the transmission.

Such a system is described in the publication DE-AS No. 1,555,480. In this case, the control braking of the device is effected either by reducing the supply of fuel to the engine and thereby reducing the engine speed (engine braking) or by actuating the brake pedal to open the aforementioned throttle valve and reduce the control pressure for the servomechanism.

The pressure drop in the supply to the servomechanism results in a restoration of the hydrostatic pump control member to its neutral position.

It is important in practice to ensure, especially in forklift trucks and like vehicles, that the control element of the hydrostatic transmission has been brought fully to neutral and the vehicle to standstill before a direction change. In the case of a forklift truck this is especially important to prevent undesired shifting of the load, damage of the vehicle and injury to personnel in the region thereof. On the other hand, it is desirable to allow the operator of the vehicle to shift his control lever from one directional position into the opposite directional position in spite of the fact that full standstill has not been reached and the deceleration process is yet in progress. This allows the operator of the vehicle to concentrate upon other control processes and pay attention to other requirements which might be overlooked if, in addition to controlling the braking operation, he must select the direction for future movement of the vehicle.

OBJECT OF THE INVENTION

It is the object of the present invention, therefore, to improve upon a system for bringing about directional reversal with a hydrostatic transmission of the aforedescribed type whereby, even after a direction-reversing command has been issued to the system, the operator has complete control of the process and is not encumbered with the need to switchover from one direction to another at any particular instant in time.

SUMMARY OF THE INVENTION

This object is achieved by providing the direction-selection lever in a relationship to a force-storing means, such as a lever or a hydraulic pressure source, such that shifting of the lever into one or another of its extreme positions applies a force which tends to act in a corresponding direction upon the 3/2 direction-reversing valve while a latching device is provided to prevent the shifting of this valve until the control element of the hydrostatic pump reaches a predetermined position corresponding to the neutral position in response to a reduction in the control pressure.

According to the invention, the direction-reversing valve can be provided with a mechanical latch which locks in either of the extreme positions of this valve and is cammed open upon return of the control element to its neutral position. In an alternative construction, the latching means is a hydraulic valve blocking the hydraulic lines supplying the oppositely effective cylinders to this valve.

According to a feature of the invention, the force-storing means is a spring which is connected to the direction-changing valve and is acted upon by the direction-selecting lever while, in an alternative construction, the force-storing means is a source of hydraulic fluid controlled by a valve connected to this lever.

Various publications, for example DE-OS No. 19 15 107 and DE-OS No. 21 29 830, disclose reversing devices for the main network of a hydrostatic transmission which can be reversed only when the pump is set into its zero output position. Such arrangements have only been found to be effective heretofore in hydrostatic pumps operating only in one direction so that control of the reversal process in all phases thereof is not possible.

In the publication DE-OS No. 14 26 450, a system is described which permits speed change by a preselected switch operation but in this case the switchover is triggered only when the reversing valve is actuated.

By contrast, the system of the present invention permits the operator to control the deceleration to standstill and then control acceleration to the desired speed without having to act during the process to switch the speed reversing lever. The actual switchover point is automatically determined when the vehicle reaches standstill or the control element of the pump reaches its neutral position.

While the system has been described for a vehicle, it is also applicable to any reversible machine such as a windlass, crane, boom or the like.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
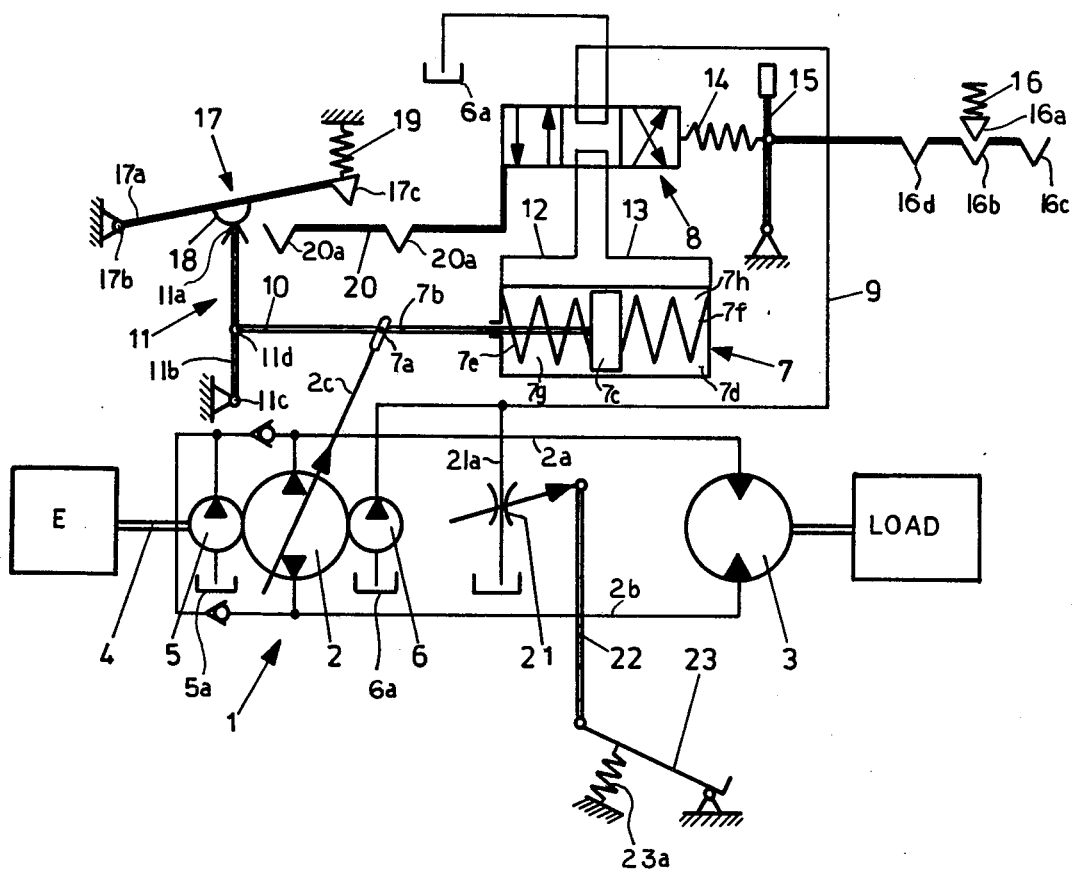
FIG. 1 is a diagram of a control system embodying the present invention with mechanical latching.

The embodiment of FIG. 1 comprises a hydrostatic transmission which has been represented generally at 1 and includes a variable-displacement axial-piston pump 1 driven by a shaft 4 and connected by hydraulic lines 2a and 2b to the opposite ports of a hydrostatic motor 3.

An internal combustion engine E is connected to the shaft 4 and drives the pump 2. The shaft 4 also operates an oil-feed pump 5 which replenishes the oil in the hydrostatic transmission from a reservoir 5a, and a control-fluid pump 6 which constitutes a source of the hydraulic fluid used in the control system of the present invention.

In accordance with conventional axial-displacement pump principles, the pump 2 is provided with a swingable control element 2c, such as a swash plate, which can be displaced to vary the stroke volume per revolution of the pump. The control element 2c is, in turn, displaced by a servomechanism which is represented in part at 7, the latter constituting the pump-adjusting member of the system.

More specifically, the control element 2c is articulated at 7a to a piston rod 7b connected to the piston 7c which is displaceable within a hydraulic cylinder 7d between a pair of centering springs 7e and 7f, respectively. Thus, when the chamber 7g of the cylinder is charged with fluid and chamber 7h is drained, the piston 7c is displaced to the right and member 2c is rotated in the clockwise sense. Conversely, when chamber 7h is charged with fluid and chamber 7g is drained, the piston 7c is displaced to the left to entrain member 2c in the counterclockwise sense.

The piston rod 7b is connected via a link 10 to a setting signaler generally represented at 11 and the function of which will be discussed in greater detail below.

Hydraulic lines 12 and 13 connect the chambers 7g and 7h with two ports of a 4-port, 3-position valve (i.e. a 3/2 valve) whose other two ports are connected respectively to the output side of pump 6 and to the reservoir 6a for the control fluid. In the position of the valve 8 shown in FIG. 1, the lines 12 and 13 are interconnected and the springs 7e and 7f will automatically center the piston 7c. In the position shown at the right-hand end of the valve, chamber 7g is connected to the reservoir 6a and chamber 7h is pressurized by the pump 6. In the other limiting position of the valve, pump 6 is connected to chamber 7g while chamber 7h is connected to the reservoir 6a. The valve is thus a reversing valve. The mechanism 17–20 can latch the valve 8 in either of its extreme positions and a preselection device is represented at 14, 15, 16.

A line 9 connects the pressure side of pump 6 with the switchover valve 8 and this line is connected, in turn, to a bypass 21a including a variable-cross-section throttle 21 which is controlled by a link 22 to the brake pedal.

The hydrostatic transmission 1 is controlled by the valve 8 which acts upon the cylinder 7 in the manner previously described and the selected position of the valve 8 is facilitated by the latch 16 which can lock the direction-selector lever 15 releasably in either of the three positions corresponding to neutral, reverse and forward drive. Assuming that the lever 15 is displaced to the left from its neutral position in which it is indexed by the head 16a engaging the recess 16b, the spring 14 is compressed to urge the valve member 8 to the left and establish a connection between line 12 and the reservoir 6a and between line 13 and the pump 6. In this position, the head 16a indexes in the recess 16c. When the lever 15 is swung in the clockwise sense from its neutral position, the head 16a can index in the recess 16d while the spring 14 draws the valve member 8 to the right to afford communication between the pump 6 and line 12 while connecting line 13 to the reservoir 6a. Thus, the lever 15, with appropriate indexing, selects the desired direction of travel and indexes the valve accordingly.

The position signaler 11 is effective only in the neutral position of the piston 7c to release the latching system 17. For example, the latching system 17 can include a lever 17a hinged at one end 17b and biased downwardly by a spring 19. The underside of the lever 17a may be formed with a bulge 18 which, in the neutral position of piston 7c, is aligned with the head 11a of the signaler lever 11b which is hinged at 11c and is articulated at 11d to the link 10. When the piston 7c is to either side of its neutral position, the lever 17a can drop down and permit its nose 17c to engage in one of the recesses 20a and 20b of a latching bar 20 connected to the valve member. The head 11a can be formed with inclined flanks for camming the bulge or cam follower 18 upwardly as the piston 7c is displaced toward its neutral position.

The position-signaling rod 11 unlatches member 17 of the latching mechanism 17–20 only in the neutral position of the setting member 2c of pump 2 so that only in this position can direction-reversing valve 8 reverse the hydrostatic transmission 1 via the cylinder 7.

The control pump 6 generates, by being coupled to the shaft 4 and connected in parallel to the throttle 21, a pressure which is a function of the speed of the engine and which is applied to the pump-shifting cylinder 7. When the brake pedal 23 is actuated, the throttle 21 is opened and the pressure applied to the pressurized chamber of cylinder 7 is reduced to permit the springs 7e and 7f to restore the control member 2c into its neutral position. The hydrostatic transmission 2, 3 thus acts as a hydrostatic brake for the vehicle. The brake pedal 23 thus controls the return of the pump to its neutral condition and hence the deceleration of the vehicle by controlling the pressure drop applied to the cylinder 7. The release of the brake pedal enables the spring 23a to close the throttle 21 and again permit a buildup of the control pressure to enable shifting from one direction to the other by means of the selector lever 15.

Figure 2:
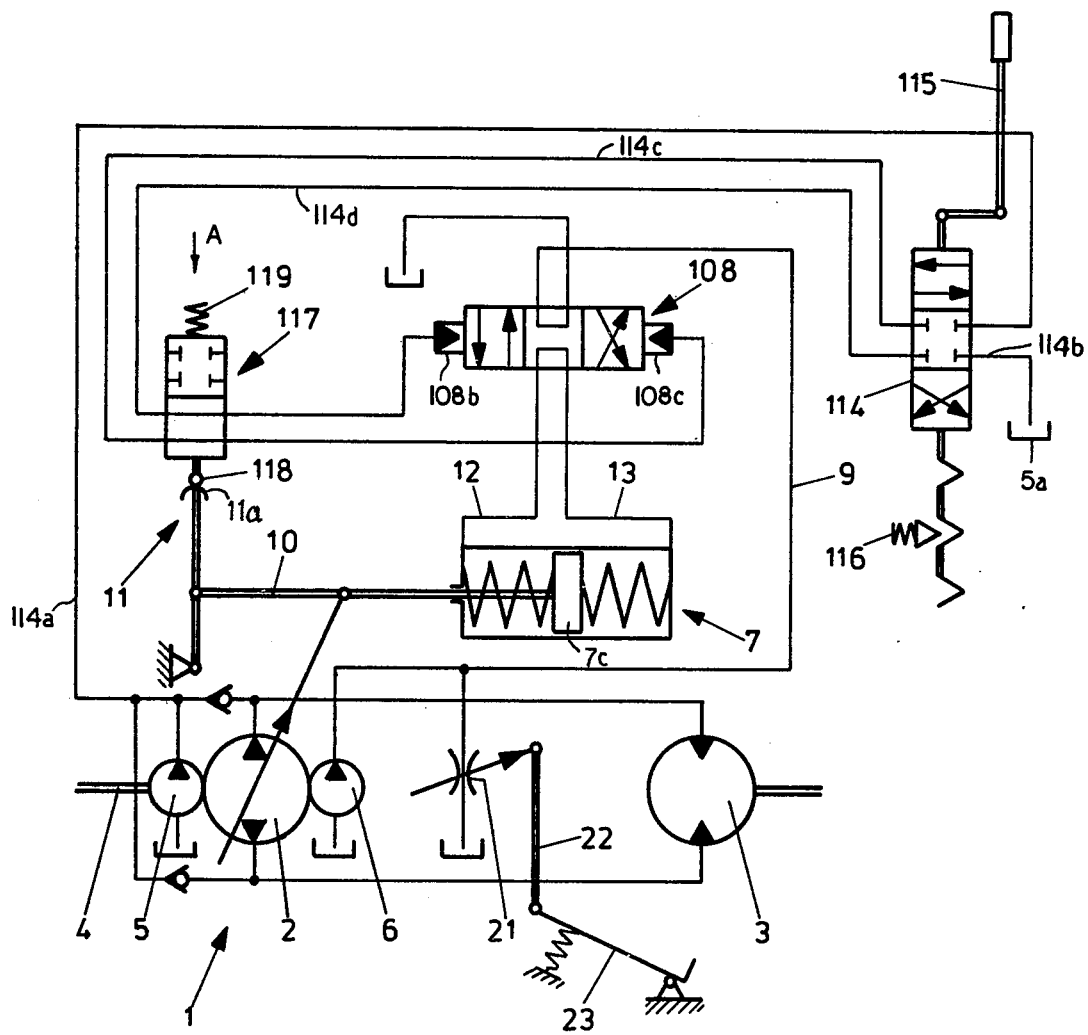
FIG. 2 is a diagram of the system using only hydraulic control elements for the same purpose.

In FIG. 2 I have shown a system in which the mechanical latching mechanism 17–20 of FIG. 1 is replaced by a hydraulic latching system and in this Figure parts which are identical to those of FIG. 1 have the same reference numerals while parts which function similarly but are hydraulic instead of mechanical, are given reference numerals similar to those of FIG. 1 but in the hundreds series.

In this embodiment, the direction-reversal valve 108 is of the hydraulically actuated type and has actuating pistons 108b and 108c which are connected to a 4-port, 2-position valve 117. In the neutral position of the piston 7c, the camming head 11a displaces the valve 117 into the operative position shown to enable control of the valve 108 by a further valve 114. The valve 114 is controlled, in turn, by a lever 115. In the neutral position illustrated for valve 114, in which it is indexed by the spring detent 116, hydraulic fluid is led from the main hydraulic circuit via a line 114a which is blocked as is the connection 114b to the reservoir 5a.

When the valve 114 is to be shifted into one of its extreme positions corresponding to forward or reverse drive, hydraulic fluid passes via line 114a through the line 114c and the open valve 117 to the piston 108c to shift the valve 108 to the left, the fluid from cylinder 108b returning via line 114d to line 114b and the reservoir. When the valve 108 is shifted to the left, the pump 6 is connected to line 13 and the piston 7c is displaced to the left correspondingly to shift the pump 2 into the corresponding drive direction position. Concurrently, the camming head 11a releases the cam follower 118 so that the spring 119 shifts the valve 117 into its blocking position (arrow A), thereby blocking fluid to or from the cylinders 108b and 108c and preventing further operation of valve 108 and hence reversal of direction of the transmission until the pump 2 has been restored to its neutral position. This is accomplished via brake pedal 23 and the throttle 21 in the manner previously described. The other direction selection is effected similarly except that the functions of cylinders 108b and 108c are reversed and the other extreme position of valve 114 is used.

I claim:

1. A hydrostatic transmission comprising:
   a hydrostatic pump driven by a prime mover and constituting a first hydraulic machine, a hydrostatic motor connected to a load and constituting a second hydrostatic machine, and hydraulic lines connecting said motor and said load in a main working network, one of said machines having a control element shiftable between extreme positions through a neutral position to control the direction of operation of said load and the transmission ratio between said machines;
   a hydraulic cylinder connected to said element for displacing same;
   a three-position valve having a neutral position and a pair of limiting positions;
   a direction selector for selecting the positions of said valve and thereby controlling said cylinder correspondingly to displace said element;
   force-generating means operated by said selector to apply a corresponding force to said valve tending to urge said valve into the selected position thereof;
   locking means connected with said valve for preventing the displacement of said valve by said force-generating means unless said element is in its neutral position; and
   means responsive to the position of said element for releasing said locking means in the neutral position of said element.

2. The hydrostatic transmission defined in claim 1 wherein said force-generating means is a spring between said direction selector and said valve.

3. The hydrostatic transmission defined in claim 1 wherein said force-generating means is a source of hydraulic fluid and a further valve operated by said direction selector and connected to the first-mentioned valve for hydraulically displacing same.

4. The hydrostatic transmission defined in claim 1 wherein said locking means is a mechanical latch connected to said valve and said means for releasing said locking means is a cam connected to said element.

5. The hydrostatic transmission defined in claim 1 wherein said locking means is a blocking valve connected to a control cylinder oppositely effected to displace the first-mentioned valve, said means for releasing said locking means including a cam connected to said element.

6. The hydrostatic transmission defined in claim 1, further comprising indexing means for indexing said direction selector in an intermediate position and in a pair of opposite extreme positions.

7. The hydrostatic transmission defined in claim 1, further comprising a control-pressure pump connected to said first machine and supplying control fluid to said valve, and a variable throttle connected to the output of said control pump, said throttle being operatively connected to a brake pedal.

* * * * *